United States Patent [19]

Saito et al.

[11] Patent Number: 4,903,192
[45] Date of Patent: Feb. 20, 1990

[54] PID CONTROLLER SYSTEM

[75] Inventors: Tadayoshi Saito, Hitachiota; Junzo Kawakami, Mito; Susumu Takahashi; Testuo Suehiro, both of Katsuta; Hiroshi Matsumoto, Ibaraki; Kouji Tachibana, Katsuta, all of Japan

[73] Assignee: Hitachi, Ltd., Tokyo, Japan

[21] Appl. No.: 177,428

[22] Filed: Apr. 1, 1988

[30] Foreign Application Priority Data

Apr. 3, 1987 [JP] Japan .................. 62-80976
Aug. 14, 1987 [JP] Japan .................. 62-201733
Sep. 24, 1987 [JP] Japan .................. 62-237201

[51] Int. Cl.⁴ .................. G05B 13/00; G05B 13/02
[52] U.S. Cl. .................. 364/157; 364/158; 364/162
[58] Field of Search .................. 364/157-163

[56] References Cited

U.S. PATENT DOCUMENTS

| | | | |
|---|---|---|---|
| 3,934,124 | 1/1976 | Gabriel | 364/165 |
| 4,441,151 | 4/1984 | Hayashibe | 364/157 |
| 4,602,326 | 7/1986 | Kraus | 364/158 |
| 4,669,040 | 5/1987 | Pettit et al. | 364/162 |
| 4,754,391 | 6/1988 | Suzuki | 364/157 |
| 4,768,143 | 8/1988 | Lane et al. | 364/157 |

OTHER PUBLICATIONS

"Expert Self Tuning Control System", Measurement Technology, pp. 66-72, Sep. 1986.
"PID Self Tuning by Expert Method", Measurement Technology, pp. 52-59, Sep. 1986.
"Method of Designing Control System Based on a Partial Knowledge of Control Object", Transactions of the Society of Instrument and Control Engineers, vol. 5, No. 4, 1979.

Primary Examiner—John R. Lastova
Attorney, Agent, or Firm—Antonelli, Terry & Wands

[57] ABSTRACT

A PID controller system comprises a PID controller for PID controlling a process standing for an object to be controlled, and an automatic adjuster being responsive to a variable relating to the manipulation of the PID controller and the response shape of the control variable from the process to obtain necessary performance indexes and preparing, on the basis of the performance indexes, optimum control parameters for tuning the actual control variable to the control command value, the optimum control parameters being fedback from the automatic adjuster to the PID controller.

9 Claims, 16 Drawing Sheets

FIG. 5A
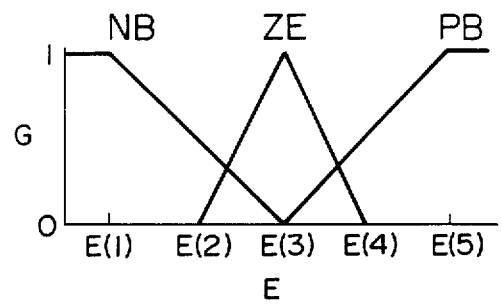
FIG. 5B
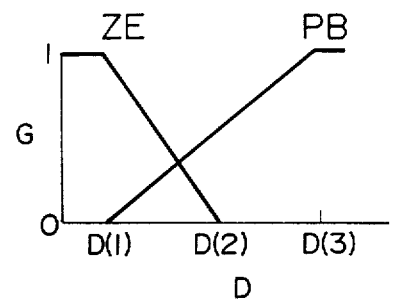
FIG. 6
| RULE | E | D | CKP | CTI | CTD |
|---|---|---|---|---|---|
| 1 | PB | PB | NB | PB | PB |
| 2 | PB | ZE | ZE | PB | PB |
| 3 | ZE | PB | ZE | ZE | PB |
| 4 | ZE | ZE | ZE | ZE | ZE |
| 5 | NB | PB | PB | PB | ZE |
| 6 | NB | ZE | PB | ZE | NB |
FIG. 7
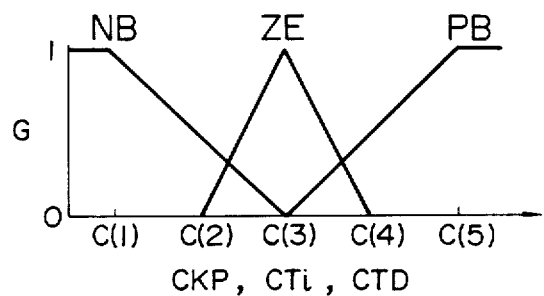

| RULE | E | D | R | CKP | CTI | CTD |
|---|---|---|---|---|---|---|
| 1 | PB | PB |  | NB | ZE | NB |
| 2 | PB | PM | PB | NB | NB | ZE |
| 3 | PB | PM | ZE | ZE | ZE | PB |
| 4 | PB | PM | NB | PB | PB | PB |
| 5 | PB | ZE | PB | NB | ZE | ZE |
| 6 | PB | ZE | ZE | ZE | PB | ZE |

PID CONTROLLER SYSTEM

BACKGROUND OF THE INVENTION

This invention relates to a PID (Proportional-Integral and Differential) controller for use in feedback control and more particularly to a PID controller system in which the tuning of PID control parameters can be effected automatically.

The invention is also concerned with a system for automatically setting PID control parameters which is applicable to processes in which the ratio of dead time to time constant is large, these processes being representative of, for example, the control of combustion in boilers and the control of temperature, pH neutralization and flow rate in chemical and general industry In the past, the tuning of PID control parameters in the PID controller is effected manually by the operator who is watching variations in control variables. This raises problems that the adjustment work becomes time-consuming and tuning results are differently affected by individuality of the operators.

On the other hand, a variety of systems based on control theory have been proposed wherein a setting test signal is applied to an object to be controlled so as to set a dynamic characteristic of the controllable object and control parameters are turned to optimum values on the basis of setting results. In these proposals, however, it is expected that because of fluctuation of control variables due to the application of the setting test signal, quality is degraded or particularly in a plant of high non-linearity, abnormal states disadvantageously take place. Further, unless the setting test is performed each time the dynamic characteristic of the controllable object is changed, optimum values of control parameters can not be obtained, thus leading to troublesome handling operations As described in "Expert Self-tuning Controller", Measurement Technology, pp 66–72, Nov., 1986, a heuristic method (expert method) is also known wherein the tuning of control parameters is effected in consideration of the shape of responses of control variables. According to this method, an actual response shape is collated with a plurality of fundamental response shapes prepared in advance and an optimum rule is selected from a plurality of adjustment rules for a matched fundamental response shape in accordance with the actual response shape or transient trend thereof, so that PID control parameters may be modified. Disadvantageously, in this method, it is expected that the number of adjustment rules is increased, resulting in an increase in memory capacity For example, "PID Self-tuning Based on Expert Method", Measurement Technology, pp 52–59, Nov., 1986 is relevant to this type of method.

At start-up of a plant incorporating controllable objects such as processes and a PID controller for controlling the objects, it is general practice that the time response of a process variable appearing when a manipulated variable standing for an input signal to a process is changed stepwise is set in terms of a dead time characteristic and a primary time lag characteristic and PID control parameters are adjusted to optimum values on the basis of process gain K, dead time L and time constant T in these characteristics. Such a method for optimum adjustment of PID control parameters based on the step response includes a Ziegler-Nichols (ZN) method and a Chein-Hrones-Reswick (CHR) method.

These methods feature simplified computations but are disadvantageous in the following points. As an example, when PID control parameters are adjusted, pursuant to the ZN method, for a controllable object having the dead time and secondary time lag characteristics, the control response changes as the command value changes in unit step, as graphically illustrated in FIG. 1A for L/T=0.14 and in FIG. 1B for L/T=1.0. Alternatively, when PID control parameters are adjusted pursuant to the CHR method, the control response changes as the command value changes in unit step, as graphically illustrated in FIG. 3A for L/T=0.14, in FIG. 3B for L/T=1 and in FIG. 3C for L/T=5. Thus, in the ZN method, the control response deviates from the stable limit at L/T=1 and in the CHR method the control response pulsates at L/T=5. Gathering from this, it is concluded that in any of the two methods excellent control can not be realized for large values of L/T.

On the other hand, as a general-purpose method for adjustment of PID control parameters' there is available a partial model matching method as described in, for example, "Design Method for Control System Based on Partial Knowledge of Controllable Object", Transactions of The Society of Instrument and Control Engineers, Vol 5, No. 4, pp 549/555, Aug., 1979.

The outline of the partial model matching method will now be described briefly. An arrangement for implementation of the partial model matching method is schematically illustrated, in block form, in FIG. 2. Referring to FIG. 2, reference numeral 1 designates a PID controller, 2 a process standing for an object to be controlled, 7 a process setter for setting a transfer function $G_p(S)$ of the process, and 11 a control parameter determiner for determining optimum values of control parameters included in a transfer function $G_c(S)$ of the PID controller.

According to the partial model matching method, the control parameters of the PID controller 1 are so determined that a closed loop transfer function W(S) covering a command value SV and a control variable PV coincides with a transfer function Gm (s, $\sigma$) of a reference model representing an ideal response of the control variable PV, where S is the Laplace operator and $\sigma$ is a time scale coefficient. The transfer function Gp(S) of process 1 obtained from the process setter 7 is indicated by the following equation:

$$Gp(S) = \frac{1}{g_0 + g_1 s + g_2^2 s^2 + g_3^3 s^3 + \cdots} \quad (1)$$

and the transfer function Gc(S) of PID controller 1 has the form of $$Gc(S) = K_P \left( 1 + \frac{1}{T_i \cdot s} + T_D \cdot s \right) \quad (2.1)$$

$$= \frac{K_P}{T_i \cdot s}(1 + T_i \cdot s + T_i \cdot T_D s^2) \quad (2.2)$$

where Kp, Ti and $T_D$ are control parameters respectively called proportional gain, integration time and differential time.

Accordingly, the closed loop transfer function W(s) is given by $$W(s) = \frac{Gc(s) \cdot Gp(s)}{1 + Gc(s) \cdot Gp(s)} \quad (3)$$

The transfer function Gm(s, o) of reference model is then given by $$Gm(s \cdot \sigma) = \frac{1}{1 + \sigma \cdot s + a_2(\sigma \cdot s)^2 + a_3(\sigma \cdot s)^3 + a_4(\sigma \cdot s)^4} \quad (4)$$

where $a_2$, $a_3$, $a_4$—are constants related to response waveforms.

By making equation (3) coincident with equation (4), the transfer function Gc(s) of PID controller is reduced to $$Gc(s) = \frac{Gm(s \cdot \sigma)}{Gp(s)\{1 - Gm(s \cdot \sigma)\}} \quad (5)$$

$$= \frac{g_0 + g_1 s + g_{2s}^2 + g_{3s}^3 + \ldots}{\sigma \cdot s\{1 + a_2\sigma \cdot s + a_3(\sigma \cdot s)^2 + a_4(\sigma s)^3 + \ldots\}}$$

By dividing the denominator by the numerator in equation (5), there results $$Gc(s) = \frac{g_0}{\sigma \cdot s} \left[ \left(1 + \frac{g_1}{g_0} - a_2\sigma\right)s + \right. \quad (6)$$

$$\left(\frac{g_2}{g_0} - a_2\frac{g_1}{g_0} - \sigma + (a_2{}^2 - a_3)\sigma^2\right)s^2 +$$

$$\left(\frac{g_3}{g_0} - a_2\frac{g_2}{g_0}\sigma + (a_2{}^2 - a_3)\frac{g_1}{g_0}\sigma^2 + \right.$$

$$\left. \left. (2a_2a_3 - a_2{}^3 - a_4)\sigma^3\right)s^3\right\} + \ldots \right]$$

Considering that equation (1) equals equation (2.2) the following formulas can be obtained:

$$\frac{Kp}{Ti} = \frac{g_0}{\sigma} \quad (7)$$

$$Ti = \frac{g_1}{g_0} - a^2 \cdot \sigma \quad (8)$$

$$Ti \cdot T_D = \frac{g_2}{g_0} - a2\frac{g_1}{g_0}\sigma + (a_2{}^2 - a_3)\sigma^2 \quad (9)$$

$$0 = \frac{g_3}{g_0} - a2\frac{g_2}{g_0}\sigma + (a_2{}^2 - a_3)\frac{g_1}{g_0}\sigma^2 + \quad (10)$$

$$(2a_2a_3 - a_2{}^3 - a_4)\sigma^3$$

From equation (10), the positive minimum real root of o is determined, which is substituted into equation (8) to determine Ti. The thus determined positive minimum real root and Ti are substituted into equations (7) and (9) to determine Kp to $T_D$. In accordance with this method, coincidence of the closed loop transfer function W(s) with the reference model Gm(s, $\sigma$) of equation (4) prevails until the fourth order term of s in equation (4).

Due to the fact that the cubic algebraic equation shown in equation (10) is solved to determined $\sigma$, this method requires sophisticated computation for which microcomputer operations are unsuited.

SUMMARY OF THE INVENTION

The present invention intends to solve the prior art problems described previously and has for its object to provide a PID controller system wherein the adjustment work by the operator can be reduced to a great extent to prevent adjustment results from being differently affected by individuality of operators, the optimum tuning of control parameters can be effected without adopting the setting signal which tends to disturb the controllable object and changes in a dynamic characteristic of the controllable object can be detected rapidly without resort to any manual operations, whereby optimum control characteristics can always be maintained.

Another object of this invention is to provide a PID controller system which can obtain an excellent control characteristic even for a process in which the ratio of dead time to time constant is large and which can determine optimum values of PID control parameters in accordance with relatively simplified computation formulas to ensure that the PID controller system can be operated even by the aid of such a computing unit of small throughput as a microcomputer.

According to the invention, the above first object can be accomplished by a PID controller system comprising a control variable response shape recognizer for observing a control variable response shape appearing when a command value or set point changes or external disturbance is applied so as to determine necessary performance indexes a, control parameter modifier for evaluating the performance indexes qualitatively so as to deduce or estimate modified values of PID control parameters through fuzzy reasoning, and a controllability decision device for causing the control parameter modifier to operate when the performance indexes go beyond their permissible ranges.

As regards the attainment of the second object, based on observation that the conventional partial model matching method is difficult to solve the cubic algebraic equation in order to obtain the root necessary for determining the time scale coefficient, it has been found that the controllable object set in terms of the dead time and primary time lag characteristics can be approximated by a multi-order time lag characteristic in order that the time scale coefficient determined by making the closed loop transfer function of control variable coincide, for the command value, with the transfer function of reference model can be approximated by a linear equation of the dead time.

By using results of the approximation, the optimum values of PID control parameters are represented by functions of gain, dead time and time constant relating to processes and are determined pursuant to specified relations.

BRIEF DESCRIPTION OF THE DRAWINGS

FIGS. 5A and 5B are graphs respectively showing membership functions for evaluating overshoot and membership functions for evaluating damping ratio, these membership functions being used in the FIG. 4 embodiment.

FIG. 6 shows an example of adjustment rules.

FIG. 7 is a graph showing membership functions for control parameter modifying coefficients.

DESCRIPTION OF THE EMBODIMENTS

The invention will now be described by way of example with reference to the accompanying drawings.

Figure 1A:
FIGS. 1A and 1B are graphs showing prior art examples of control response obtained when the controllable object having the dead time and secondary time lag characteristics is controlled by changing the command value stepwise in a conventional PID controller in which PID control parameters are determined using the conventional ZN method, FIG. 1A being for L/T=0.14 and FIG. 1B being for L/T=1.
Figure 1B:
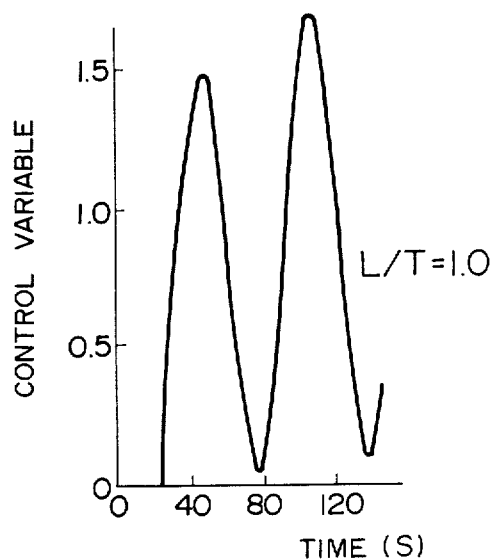
Figure 2:
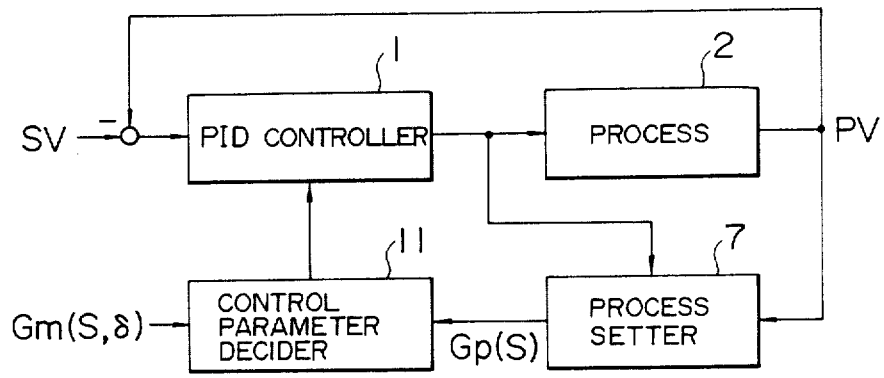
FIG. 2 is a block diagram of a prior art arrangement for implementation of control in accordance with the partial model matching method.
Figure 3A:
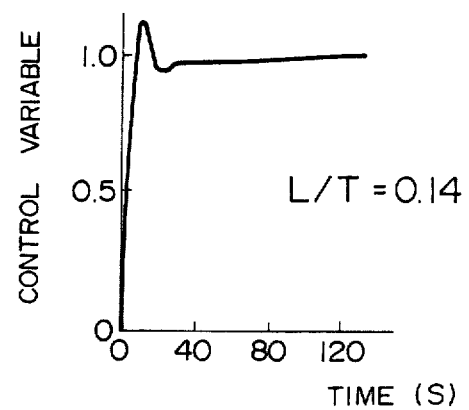
FIGS. 3A, 3B and 3C are graphs showing prior art examples of control response obtained when the controllable object having the dead time and secondary time lag characteristics is controlled by changing the command value stepwise in a conventional PID controller in which PID control parameters are determined using the conventional CHR method, FIG. 3A being for L/T=0.14, FIG. 3B for L/T=1 and FIG. 3C for L/T=5.
Figure 3B:
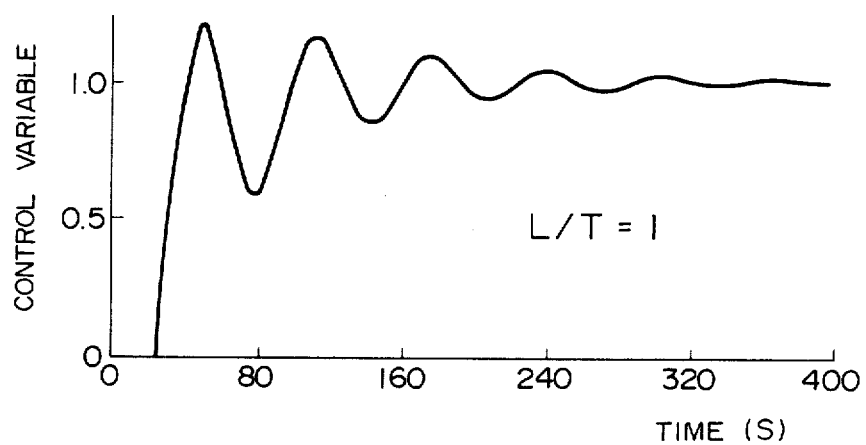
Figure 3C:
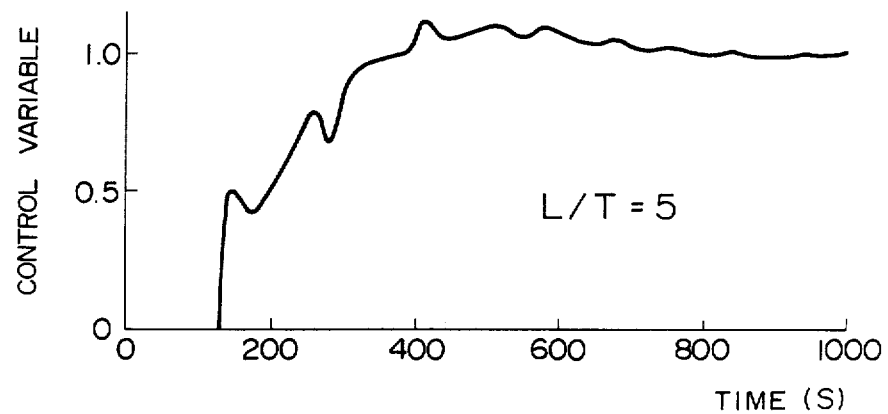
Figure 4:
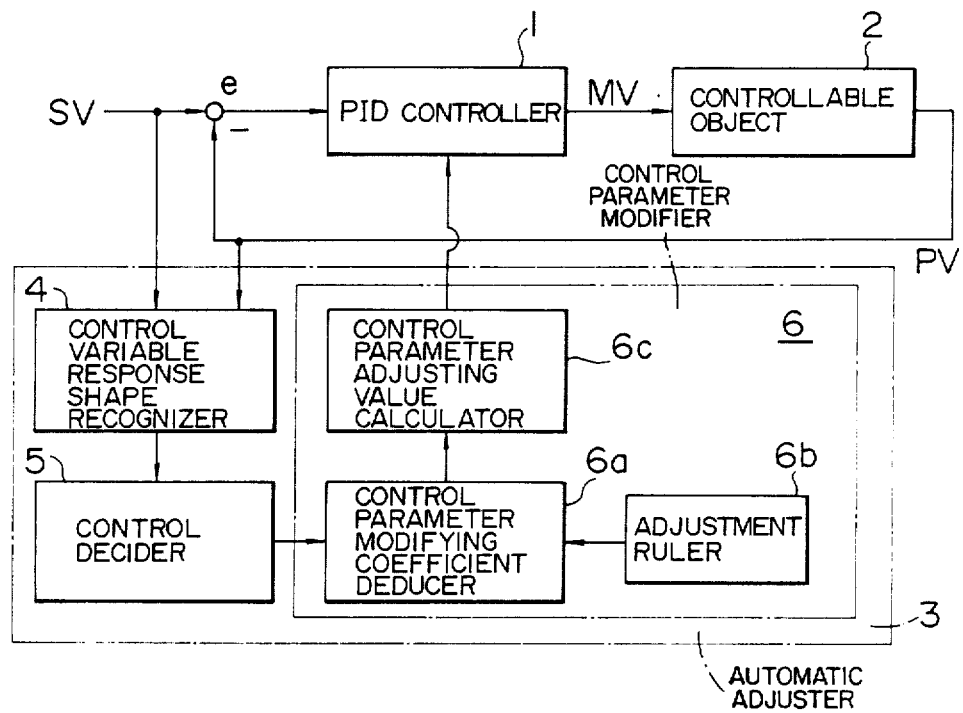
FIG. 4 is a block diagram illustrating a PID controller system according to a first embodiment of the invention.

As schematically shown in a block diagram of FIG. 4, a PID controller system according to a first embodiment of the invention comprises a PID controller 1, an object 2 to be controlled and an automatic adjuster 3.

The PID controller 1 performs a PID computation of a control difference e which is obtained from comparison of a command value SV with a control variable PV and produces a PID computation result which is applied as a manipulated variable MV to the controllable object 2. The automatic adjuster 3 comprises a control variable response shape recognizer 4, a control decider 5 and a control parameter modifier 6. The control parameter modifer 6 includes a control parameter modifying coefficient deducer 6a, an adjustment ruler 6b and a control parameter adjusting value calculator 6e.

Individual components described above will now be described specifically. The control variable response shape recognizer 4 always watches or supervises the command value or set point SV and control variable PV and begins to observe a control variable response at time that the control difference e exceeds a predetermined value after the control variable PV has been tuned to the command value SV. Concurrently with the commencement of the observation, the recognizer 4 retrieves extreme values of PV and ends the observation when the control variable PV is tuned to the command value SV. The recognizer 4 then computes the amount of overshoot and the damping ratio on the basis of a plurality of obtained extreme values and a change width of the command value SV.

In the absence of extreme values of the control variable PV, negative pseudo-values are set. The control decider 5 determines that the control parameters are of optimum values if the obtained overshoot and damping ratio respectively fall within their permissible ranges and ends the tuning. If any one of the overshoot and damping ratio does not fall within the permissible range, the decider 5 actuates the control parameter modifier 6.

The control parameter modifying coefficient deducer 6a, when based on the fuzzy reasoning method, will now be described. In order to qualitatively evaluate the amount of overshoot and the magnitude of damping ratio, membership functions as shown in FIGS. 5A and 5B are defined. In FIGS. 5A and 5B, E(i) where i=1-5 and D(i) where i=1-3 are constants for prescribing the the shape of the membership function, and PB, ZE and NB are names assigned to the membership functions with the view of evaluating the magnitude qualitatively. The names have the following meanings:

PB: Positive Big
ZE: Zero
NB: Negative Big.

In these Figures, ordinate represents the membership value G which is representative of the qualitative degree. Enumerated in FIG. 6 is an example of adjustment rules of the adjustment ruler 6b for PID control parameters which are prescribed by various control variable response shapes prepared using the member ship functions.

Taking a rule 1, for instance, this rule has the meaning "If E is PB and D is PB, then CKP is NB, CTD is PB and CTD is PB.", "if clause" being called a conditional clause and "then clause" being called a conclusive clause, where E is a modifying coefficient for the amount of overshoot, D is a modifying coefficient for the damping ratio, CKP is a modifying coefficient for the proportional gain, CTI is a modifying coefficient for the integration time and CTD is a modifying coefficient for the differential time. FIG. 7 graphically illustrates membership functions used for converting the qualitatively determined control parameter modifying coefficients into quantitative values. In FIG. 7, C(i) where i=1-5 is the constant for prescribing the shape of the membership functions, PB, ZE and NB are names which are assigned to the membership functions with the view of qualitatively indicating the magnitude of the control parameter modifying coefficients and which correspond to the names used in FIGS. 5A and 5B, and ordinate represents the membership value.

Figure 8:
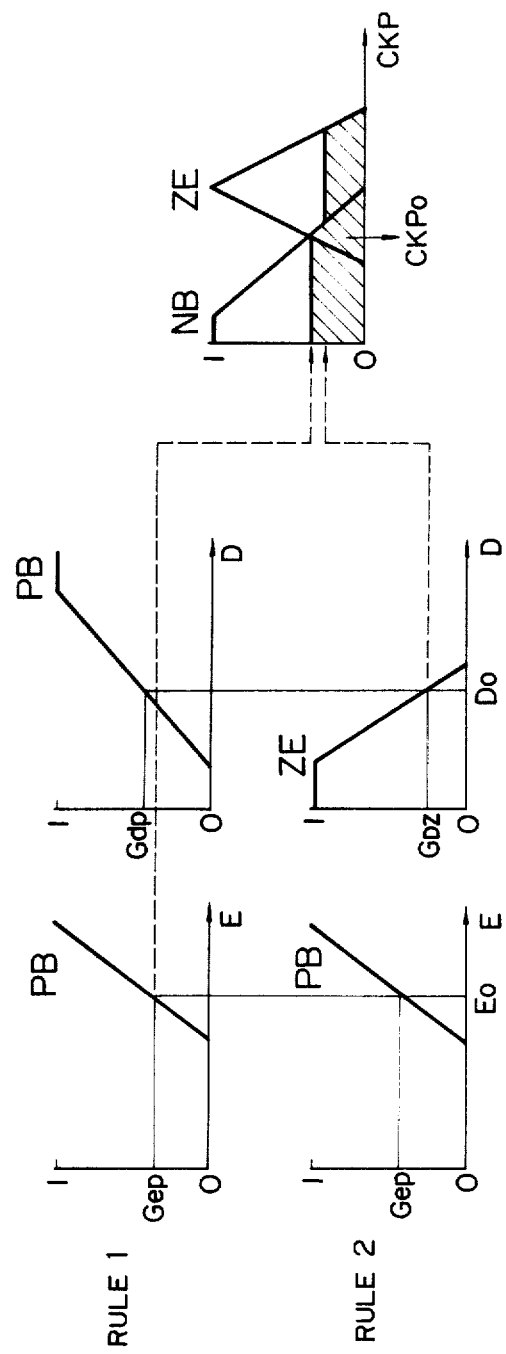
FIG. 8 illustrates graphical representations useful to explain the manner of determining control parameter modifying coefficients.

Taking the cases where rules 1 and 2 are applied, for instance, the manner of determining the control parameter modifying coefficients will now be described. Referring particularly to FIG. 8, there is illustrated the manner of determining the modifying coefficient CKP for the proportional gain in accordance with the fuzzy reasoning method. The qualitative degree of the amount of overshoot Eo and the damping ratio Do which are obtained from the control variable response shape recognizer 4 is determined using respective membership functions illustrated in FIGS. 5A and 5B. In the rule 1, Eo is Gep and Do is Gdp and in the rule 2 Eo is Gep and Do is Gdz. A product set (minimum value) computation is effected within the respective rules to determine the adaptability of each rule which is Gep for rule 1 and Gde for rule 2. Subsequently, membership functions contained in the conclusive clause of each rule are weighted by the adaptability of each rule, the weighted membership functions are subjected to a sum set (maximum value) computation, and the value of center of gravity of a sum set computation result is determined as an output value CKPo of the proportional gain modifying coefficient. Output values of the integration time modifying coefficient CTI and differential time modifying coefficient CTD may be determined in a similar manner.

The control parameter adjusting value calculator 6C multiplies the thus obtained PID control parameter modifying coefficient by the current value of the PID control parameter to determine the current adjusting value.

Figure 9:
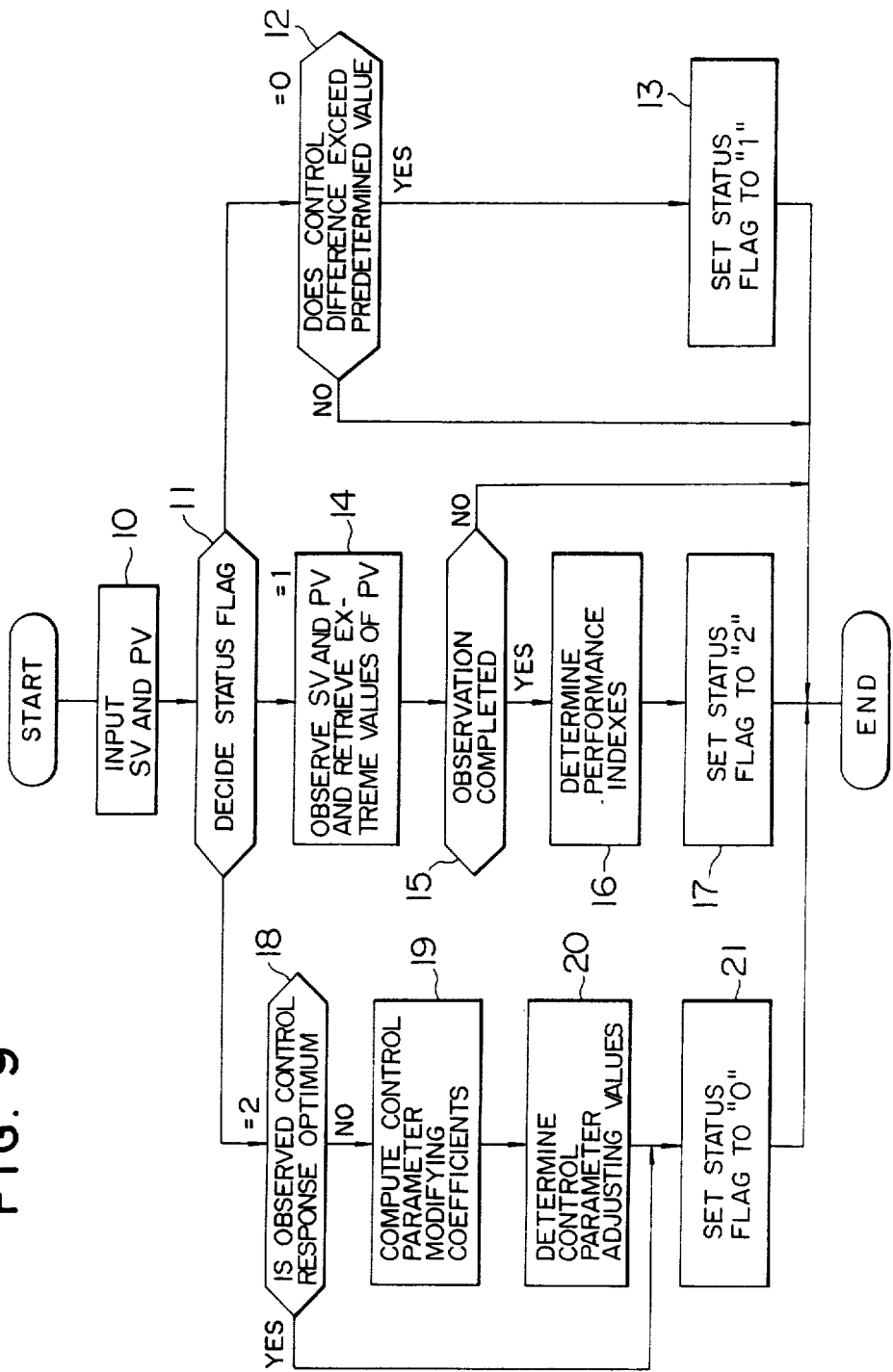
FIG. 9 is a flow chart showing the schematic procedure of an auto-tuning function.

FIG. 9 shows a schematic flow chart of the procedure in the automatic adjuster 3. In step 10, SV and PV are inputted at a predetermined period and each time the SV and PV are inputted, a status flag indicative of the process status of the automatic adjuster 3 is decided in step 11. The status flag being "0" indicates a status for monitoring or supervising the control response, the status flag being "1" indicates a status for observing and evaluating the control response and the status flag being "2" indicates a status for computing the control parameters. With the status flag being "0", it is determined in step 12 whether the control difference exceeds a predetermined value. If the control difference exceeds the predetermined value, the status flag is set to "1" in step 13 and the procedure proceeds to the control response observing status. With the control difference not being in excess of the predetermined value, the control response supervising status is maintained. If the status flag is determined to b "1" in step 11, extreme values of PV are retrieved in step 14. This process is for each PV inputted and continues until it is determined in step 15 that PV is tuned to SV (completion of the observation). Upon completion of the observation, performance indexes (overshoot amount and damping ratio) are determined in step 16 by using results of the extreme value retrieval performed in step 14, the status flag is set to "2" in step 17 and the procedure proceeds to the control parameter computing status. The process flow described till now corresponds to the operation of the control response shape recognizer 4.

If it is decided in step 11 that the status flag is "2", it is determined in step 18 whether the observed control response is optimum by using decision as to whether the performance indexes determined in step 16 fall within their permissible ranges. This process corresponds to the operation of the control decider 5. Only in the case where the control response is not optimum, the modifying coefficients for the control parameters and determined in step 19 and adjusting values for the control parameters are determined in step 20. The thus obtained control parameter adjusting values are used for the control computation in the PID controller 1. The step 16 corresponds to the operation of the control parameter modifying coefficient deducer 6a and adjustment ruler 6b and the step 20 corresponds to the operation of the control parameter adjusting value calculator 6c. When the control response is decided to be optimum in step 18 and the process in step 20 ends, the status flag is reset to "0" in step 21 and the procedure returns to the control response supervising status.

Figure 10:
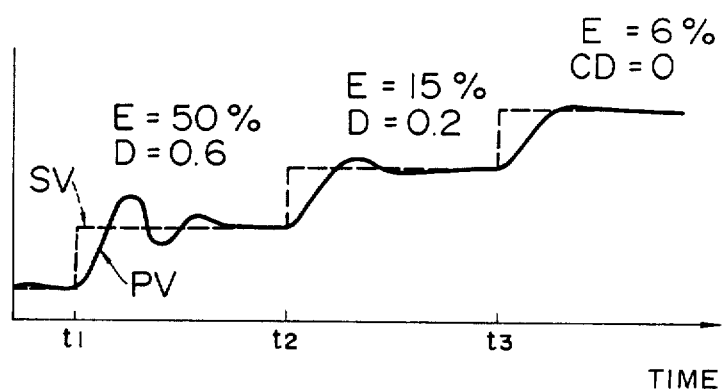
FIG. 10 is a graph showing results of autotuning according to the invention.

The PID controller system of this embodiment is operated for the controllable object having the secondary time lag and dead time characteristics, exhibiting results as graphically illustrated in FIG. 10. Particularly, the time response of the control variable PV obtained when the command value SV is changed is illustrated in FIG. 10. At time that the SV changes stepwise initially, the initial control response of PV follows the change of SV with the overshoot amount E being 50% and the damping ratio D being 0.6, thereafter the performance indexes (overshoot amount and damping ratio) obtained from observation results of twice trials which correspond to the twice step changes of the SV can fall within predetermined permissible ranges of the performance indexes, indicating attainment of the optimum tuning, and hence the tunning completes at the third trial.

As described previously, the auto-tuning of control parameters can be achived using a small number of adjustment rules.

Although all the membership functions are of a triangular form for illustration purpose only, they are not limited thereto and may be realize with a quadratic curve or an exponential curve without disturbing the essentiality of the invention. Further, the number of membership functions may desirably be set.

Figure 11:
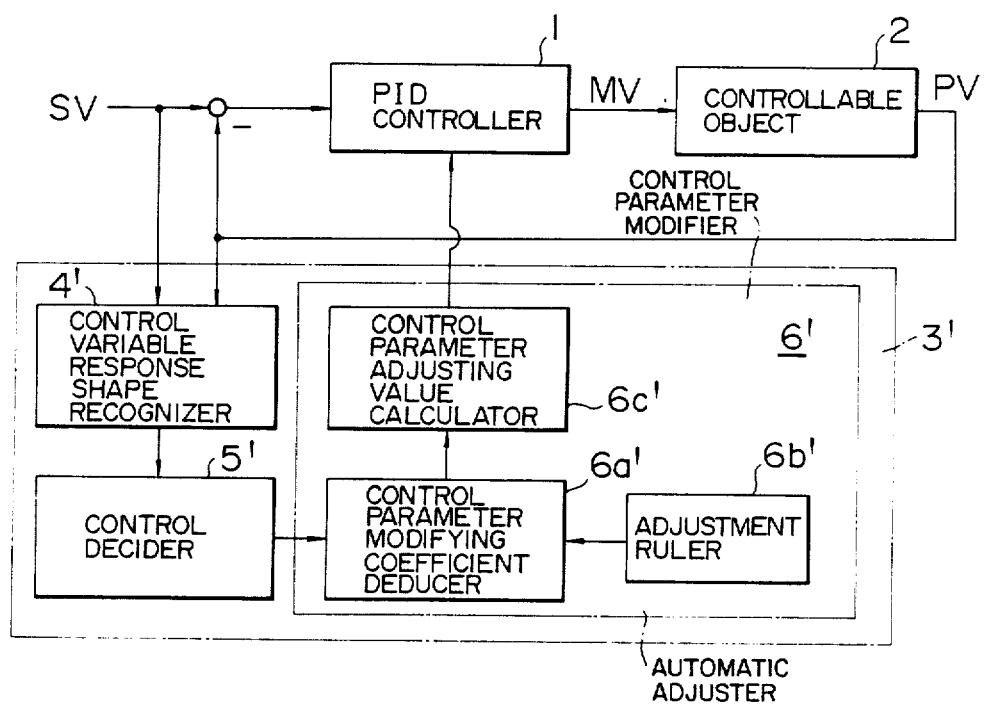
FIG. 11 is a block diagram illustrating a PID controller system according to a second embodiment of the invention.

Referring to FIGS. 11 to FIG. 18A and FIG. 18B, a PID controller system according to a second embodiment of the invention will be described. This embodiment differs from the first embodiment described in connection with FIGS. 4 to 10 in that in addition to the overshoot and damping ratio, the ratio of period is employed as a control parameter. Since a block configuration form of FIG. 11 is essentially identical to that of FIG. 4 relevant to the first embodiment with the only exception that the former is so modified as to handle the ratio of period as an additional observation parameter, reference numerals in FIG. 4 are added with dash to designate blocks or components of FIG. 11 which correspond to those of FIG. 4. Observation and control are actually carried out in a manner as will be described below.

Figure 12A:
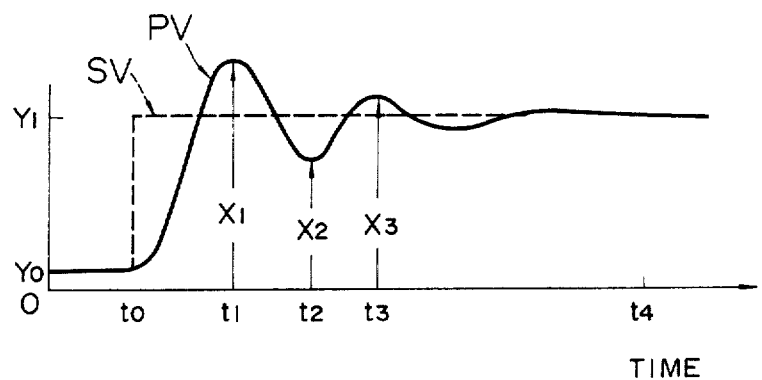
FIGS. 12A and 12B are graphs respectively showing the control variable response shape obtained when the command value changes stepwise and the control variable response shape obtained when external disturbance is applied stepwise.

A control variable response shape recognizer 4' always supervises the command value SV and control variable PV and begins to observe a control variable response at time that the control difference e exceeds a predetermined value after the control variable PV has been tuned to the command value SV. Concurrently with the commencement of the observation, the recognizer 4' retrieves extreme values of control variable PV and ends the observation when the control variable is tuned to the command value SV. The recognizer 4' then computes the amount of overshoot, damping ratio and period ratio on the basis of a plurality of obtained extreme values and times the extreme values occur. The manner of determining these control parameters will be described with reference to FIGS. 12A and 12B. FIG. 12A particularly illustrates an example of time response of the control variable PV obtained when the command value SV changes stepwise from $Y_0$ to $Y_1$ at time $t_0$, indicating that extreme values $X_1$, $X_2$ and $X_3$ occur at times $t_1$, $t_2$ and $t_3$ and the tuning is completed at time $t_4$. The overshoot amount E, damping ratio D and period T are given by $$E = (X_1 - Y_1)/(Y_1 - Y_0)$$
$$D = (X_3 - X_2)/(X_1 - X_2)$$
$$T = t_3 - t_1.$$

Accordingly, given that the previous value of period is $T_1$, the period ratio R is expressed by $$R = T_1/T.$$

Figure 12B:
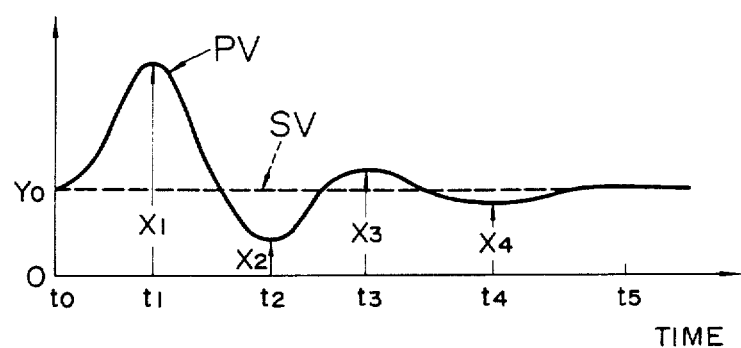

FIG. 12B particularly illustrates an example of time response of the control variable PV obtained when an external disturbance is applied to the input of the controllable object with the command value maintained at $Y_0$, indicating that extreme values $X_1$, $X_2$, $X_3$ and $X_4$ occur at times $t_1$, $t_2$, $t_3$ and $t_4$ and the tuning is completed at time $t_5$. The overshoot amount E, damping ratio D and period T are given by $$E = (Y_0 - Y_2)/(X_1 - Y_0)$$
$$D = (X_3 - X_4)/(X_3 - X_2)$$
$$T = t_4 - t_2.$$

If no extreme value apperas in the control variable reponse shape as the command value changes or if no second-occurrence extreme value appears in the control variable response shape when the external disturbance is applied, the overshoot is set to a negative value and the period is set to zero. If only one extreme value occurs in the control variable response shape in response to the change of the command value or if only two extreme values occur in the control variable response shape in response to the application of the external disturbance, the time difference referenced to the tuning time is used as the period.

A control decider 5' determines that the control parameter are of optimum values the obtained overshoot and damping ratio respectively fall within their permissible ranges and ends the tuning. If any one of the overshoot and damping ratio does not fall within the permissible range, the decider 5' actuates a control parameter modifier 6'.

Figure 13A:
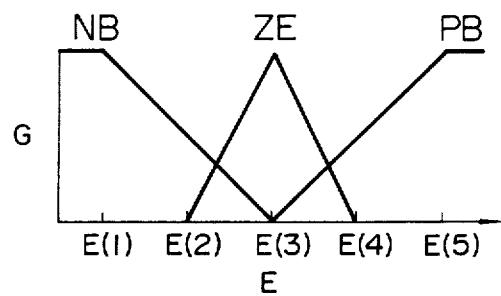
FIGS. 13A, 13B and 13C are graphs respectively showing membership functions for evaluating overshoot, membership functions for evaluating damping ratio and membership functions for evaluating period.
Figure 13B:
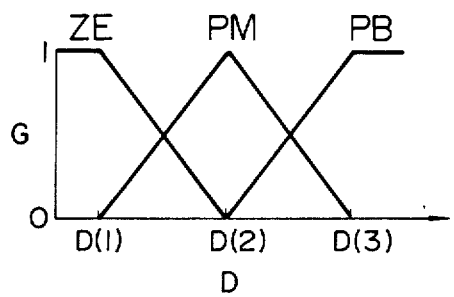
Figure 13C:
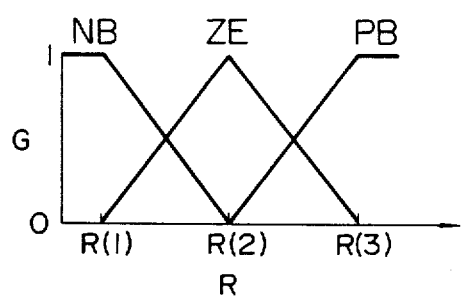

A control parameter modifying coefficient deducer 6a', when based on the fuzzy reasoning method, will now be described. In order to qualitatively evaluate the amount of overshoot and the magnitude of damping ratio and period ratio, membership functions as shown in FIGS. 13A, 13B and 13C are defined. In FIGS. 13A to 13C, E(i) where i=1-5, D(i) where i=1-3 and R(i) where i=1-3 are constants for prescribing the shape of the membership function, and PB, PM, ZE and NB are names assigned to the membership functions with the view of evaluating the magnitude qualitutively. As in the case of the first embodiment, the names have the following meanings:

PB: Positive Big
PM: Positive Medium
ZE: Zero
NB: Negative Big

Figures 14, 15:
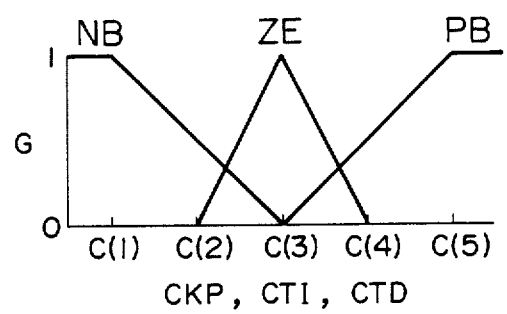
FIG. 14 shows an example of adjustment rules used for the respective types of membership function.
FIG. 15 is a graph showing membership functions for control parameter modifying coefficients.

In these Figures, ordinate represents the membership value G which is representative of the qualitutive degree. Enumerated in FIG. 14 is an example of adjustment rules of an adjustment ruler 6b' for PID control parameters which are prescribed by various control variable response shapes prepared using the membership functions.

Taking a rule 2, for instance, this rule has the meaning "If E is PB, D is PM and R is PR, then CKP is NR, CTI is NB and CTD is ZE", "if clause" being called a conditional clause and "then clause" being called a conclusive clause, where E is a modifying coefficient for the overshoot amount, D is a modifying coefficient for the damping ratio, R is a modifying coefficient for the period ratio, CKP is a modifying coefficient for the proportional gain, CTI is a modifying coefficient for the integration time and CTD is a modifying coefficient for the differential time. FIG. 15 graphically illustrates membership functions used for converting the qualitatively determined control parameter modifying coefficients into quantitative values. In FIG. 15, C(i) where i=1-5 is the constant for prescribing the shape of the membership functions, PB, ZE and NB are names which are assigned to the membership functions with the view of qualitatively indicating the magnitude of the control parameter modifying coefficients and which correspond to the names used in FIGS. 13A, 13B and 13C, and ordinate represents the membership value.

Figure 16:
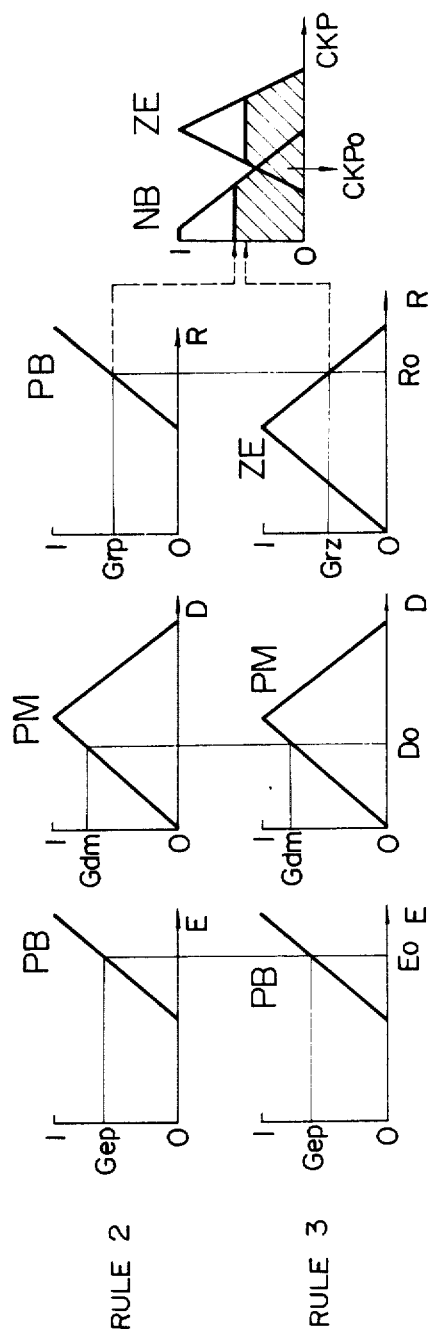
FIG. 16 illustrates graphical representations useful to explain the manner of determining the control parameter modifying coefficients.

Taking the cases where rules 2 and 3 are applied, for instance, the manner of determining the control parameter modifying coefficients will now be described. Referring particularly to FIG. 16, there is illustrated the manner of determining the modifying coefficient CKP for the proportional gain in accordance with the fuzzy reasoning method. The qualitative degree of the overshoot amount Eo, damping ratio Do and period ratio Ro which are obtained from the control variable shape recognizer 4' is determined using respective membership functions illustrated in FIGS. 13A, 13B and 13C. In the rule 2, Eo is Gep, Do is Gdm and Ro is Grp and in the rule 3, Eo is Gep, Do is Gdm and Ro is Grz. A product set (minimum value) computation is effected within the respective rules to determine the adaptability of each rule which is Grp for rule 2 and Grz for rule 3. Subsequently, membership functions contained in the conclusive clause of each rule are weighted by the adaptability of each rule, the weighted membership functions are subjected to a sum set (maximum value) computation, and the value of center of gravity of a sum set computation result is determined as an output value (KPo of the proportional gain modifying coefficient. Output values of the integration time modifying coefficient (TI and differential time modifying coefficient CTD may be determined in a similar manner.

A control parameter adjusting value calculator 6c' multiplies the thus obtained PID control parameter modifying coefficient by the current value of the PID control parameter to determine a current adjusting value.

Figure 17:
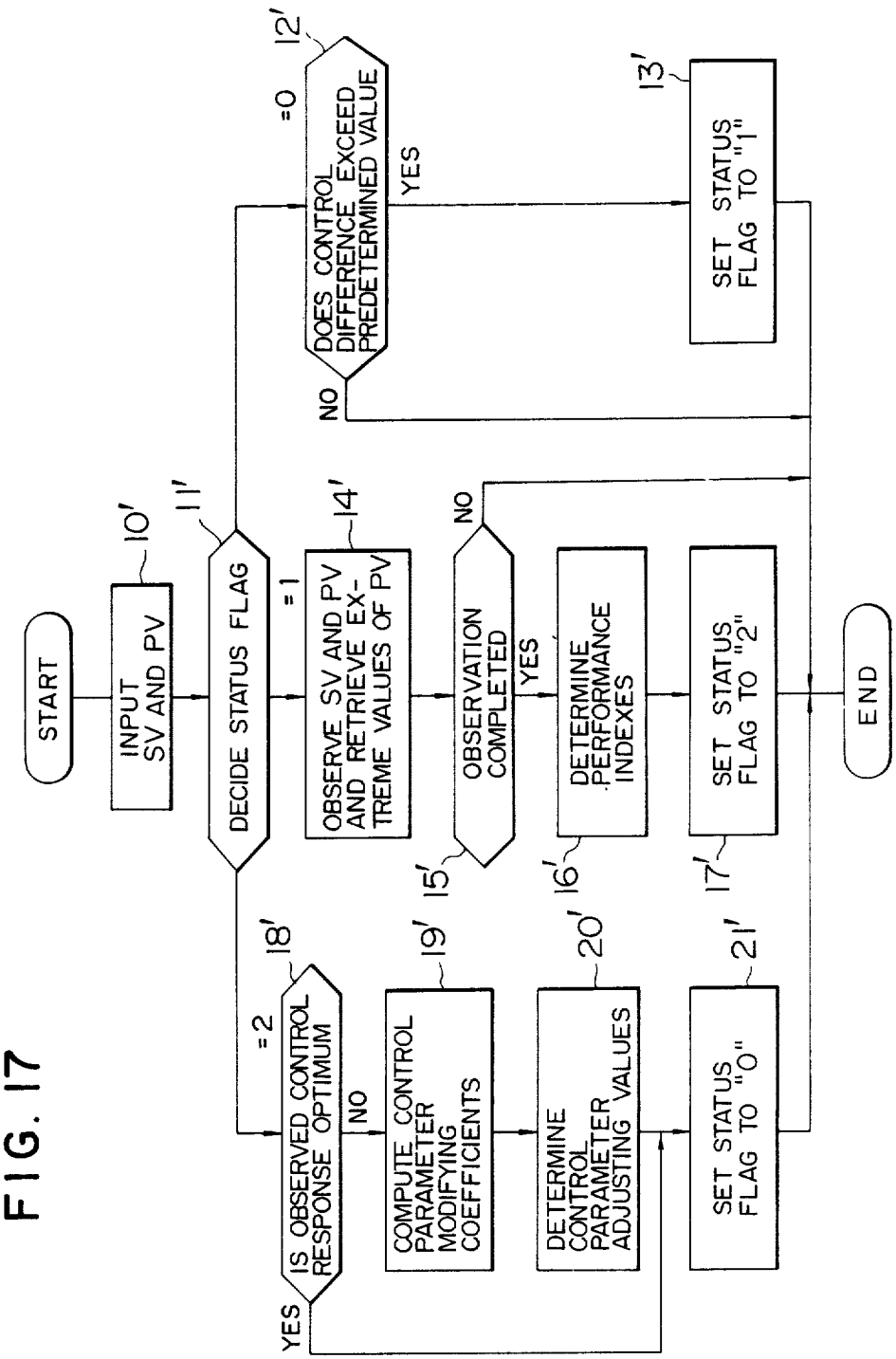
FIG. 17 is a flow chart showing the schematic procedure of another auto-tuning function.

FIG. 17 shows a schematic flow chart of the procedure in the automatic adjuster 3'.

FIG. 17 shows a schematic flow chart of the procedure in the automatic adjuster 3'. In step 10', SV and PV are inputted at a predetermined period and each time the SV and PV are inputted, a status flag indicative of the process status of the automatic adjuster 3' is decided in step 11'. The status flag being "0" indicates a status for monitoring or supervising the control response, the status flag being "1" indicates a status for observing and evaluating the control response and the status flag being "2" indicates a status for computing the control parameters. With the status flag being "0", it is determined in step 12' whether the control difference exceeds a predetermined value. If the control difference exceeds the predetermined value, the status flag is set to "1 38 in step 3' and the procedure proceeds to the control response observing status. With the control difference not being in excess of the predetermined value, the control response supervising status is maintained. If the status flag is determined to be "1" in step 11', extreme values of PV are retrieved in step 14'. This process is for each PV inputted and continues until it is determined in step 15' that PV is tuned to SV (completion of the observation). Upon completion of the observation, performance indexes (overshoot amount and damping ratio) are determined in step 16' by using results of the extreme value retrieval performed in step 14', the status flag is set to "2" in step 17' and the procedure proceeds to the control parameter computing status. The process flow described till now corresponds to the operation of the control response shape recognizer 4'.

If it is decided in step 11' that the status flag is "2", it is determined in step 18' whether the observed control response is optpimum by using decision as to whether the performance indexes determined in step 16' fall within their permissible ranges. This process corresponds to the operation of the control decider 5'. Only in the case where the control response is not optimum, the modifying coefficients for the control parameters are determined in step 19' and adjusting values for the control parameters are determined in step 20'. The thus obtained control parameter adjusting values are used for the control computation in the PID controller 1. The step 16' corresponds to the operation of the control parameter modifying coefficient deducer 6a' and adjustment ruler 6b' and the step 20' corresponds to the operation of the control parameter adjusting value calculator 6c'. When the control response is decided to be optimum in step 18' and the process in step 20' ends, the status flag is reset to "0" in step 21' and the procedure returns to the control response supervising status.

Figure 18A:
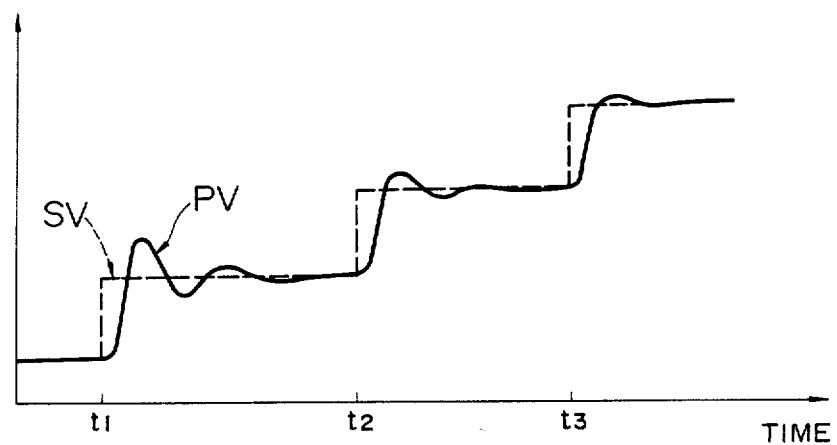
FIG. 18A is a graph showing the autoturning response in the presence of large overshoot and hunting appearing in the initial control response shape.
Figure 18B:
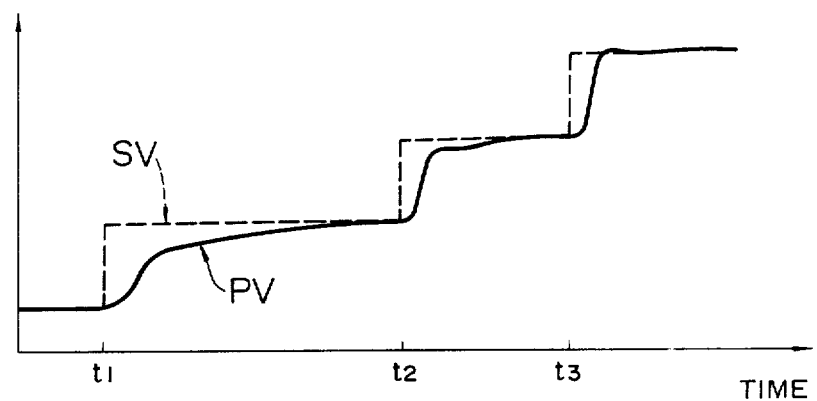
FIG. 18B is a graph showing the autotuning response in the presence of over-damping appearing in the initial control response shape.

The PID controller system of this embodiment is operated for the controllable object having the secondary time lag and dead time characteristics, exhibiting results as graphically illustrated in FIGS. 18A and 18B. Particularly, the time response of the control variable PV obtained when the command value SV is changed is shown with FIG. 18A indicating an instance where the overshoot amount E for the initial control response is 50% and the damping ratio D is 0.6 and FIG. 18B indicating an instance where the initial control response is placed in the over damping condition. It will be appreciated that in any of these instances the substantially optimum tuning can be reached through twice trials.

As described above, according to this second embodiment of the invention, not only the auto-tuning of control parameters can be achieved using a small number of adjustment rules but also the tuning can be obtained at quick response by evaluating the control variable on the basis of the period ratio. The control variable response shape recognizer can also use, as the fourth performance index, a control variable corresponding to the rise time of the previously-described control variables, the ratio between the previous and current values of occurrence time of the first-occurrence extreme value or the ratio between the previous and current values of tuning time of the control variable. The control parameter modifier 6' uses the membership functions of a triangular form but the form of the membership functions is not limited thereto and may be a quadratic curve or an exponential curve without disturbing the essentiality of the invention. Further, the number of membership functions may desirably be set.

Figure 19:
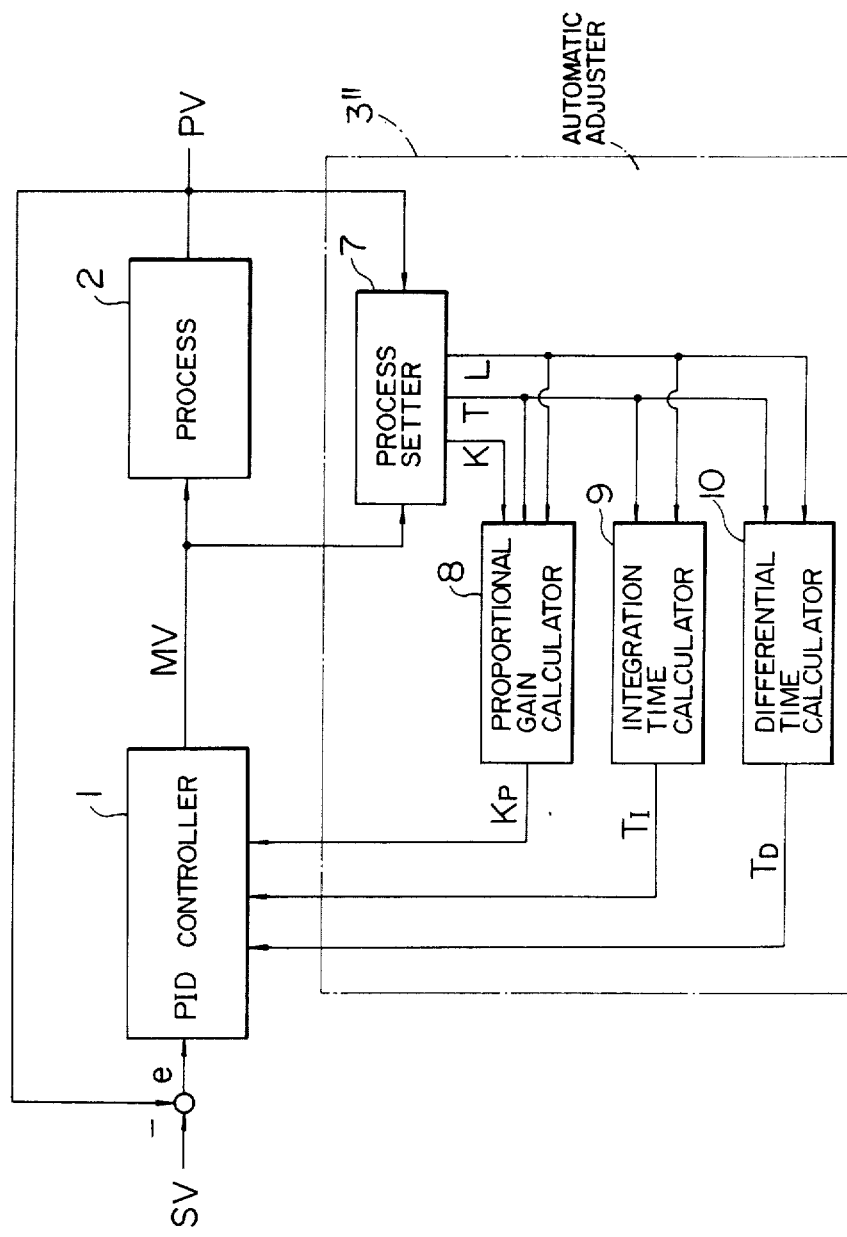
FIG. 19 is a block diagram illustrating a PID controller system according to still another embodiment of the invention.

Referring to FIG. 19 and the ensuring Figures, a PID controller system according to still another embodiment of the invention will be described. As schematically diagrammatically shown in FIG. 19, the PID controller system of this embodiment comprises a PID controller 1, a process 2 standing for an object to be controlled, and an automatic adjuster 3'' including a process setter 7, a proportional gain calculator 8, an integration time calculator 9 and a differential time calculator 10.

This embodiment of FIG. 19 is particularly suitable for setting control parameters of the PID controller 1 to optimum values at the start-up of a plant. The process setter 7 sets the dynamic characteristic of the process 2 in terms of the dead time/primary time lag characteristic and determines gain K, dead time L and time constant T of the process from the dead time and primary time lag characteristics. The proportional gain calculator 8 determines proportional gain Kp as a function of the gain K, dead time L and time constant T of the process obtained from the process setter 7, the integration time calculator 9 determines integration time $T_I$ as a function of the dead time L and time constant T obtained from the process setter 7, and the differential time calculator 10 determines differential time $T_D$ as a function of the dead time L and time constant T obtained from the process setter 7.

The calculators 8, 9 and 10 feature the present embodiment and operate for computation based on the following theory.

The dead time/primary time lag characteristic Gp(s) set by the process setter 7 is given by $$Gp(s) = \frac{K \cdot e^{-LS}}{1 + T \cdot s} \tag{11}$$

The dead time transfer function of equation (11) can be expanded and reduced by Maclaurin's expansion to $$Gp(s) = \frac{1}{\frac{1}{K} + \frac{L + T_s}{K} + \frac{L^2/2 + LT}{K}s^2 + \frac{L^3/6 + L^2T/2}{K}s^3 + \ldots} \quad (12)$$

By applying the partial model matching method to the process dynamic characteristic of equation (12), the following formulas result from equations (7) to (10)

$$\frac{Kp}{Ti} = \frac{1}{K \cdot \sigma} \quad (13)$$

$$Ti = L + T - a_2\sigma \quad (14)$$

$$Ti \cdot T_D = \frac{L^2}{2} + LT - a_2(L + T)\sigma + (a_2^2 - a_3)\sigma^2 \quad (15)$$

$$0 = \frac{L^3}{6} + \frac{L^2}{2}T - a_2\left(\frac{L^2}{2} + LT\right)\sigma + \quad (16)$$

$$(a_2^2 - a_3)(L + T)\sigma^2 +$$

$$(2a_2a_3 - a_2^3 - a_4)\sigma^3$$

Unless there is a positive real root of $\sigma$ in equation (16), the partial model matching method can not settle the command control response indicated by equation (4).

Figure 20:
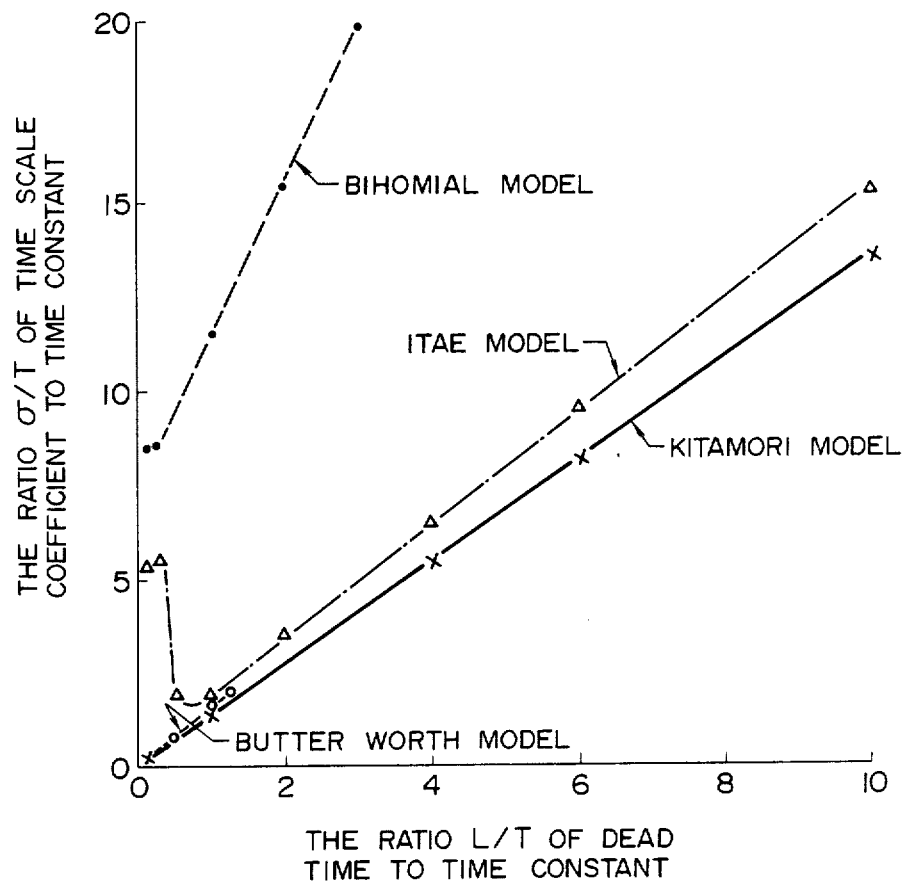
FIG. 20./is a graph showing how L/T and δ/T are related to various reference models when PID control parameters are determined, pursuant to the partial model matching method, for the controllable object having the dead time and primary time lag characteristics.

Then, the relation between the time ratio L/T to the time constant and the time scale coefficient ratio $\sigma$/T to the time constant is examined using various reference models as the parameter to obtain results as graphically illustrated in FIG. 20. The transfer functions of the reference models used in the examination are given as follows:

(1) Kitamori model $$Gm(s \cdot \sigma) = \frac{1}{1 + \sigma s + 0.5(\sigma s)^2 + 0.15(\sigma s)^3 + 0.03(\sigma s)^4} \quad (17)$$

(2) Butter worth model $$Gm(s \cdot \sigma) = \frac{1}{1 + \sigma s + 0.503(\sigma s)^2 + 0.1479(\sigma s)^3 + 0.02188(\sigma s)^4} \quad (18)$$

(3) Biromial model $$Gm(s \cdot \sigma) = \frac{1}{1 + \sigma s + 0.375(\sigma s)^2 + 0.0625(\sigma s)^3 + 0.003906(\sigma s)^4} \quad (19)$$

(4) ITAE minimum model $$Gm(s \cdot \sigma) = \frac{1}{1 + \sigma s + 0.4664(\sigma s)^2 + 0.1067(\sigma s)^3 + 0.01882(\sigma s)^4} \quad (20)$$

The variable $\sigma$ corresponds to the rise time of control response and reasonably it will increase as L increases. Thus, by studying FIG. 20, it will be understood that for Kitamori model being used as the reference model, reasonable values of $\sigma$/T can be obtained over a wide range of L/T from 0 (zero) to 10. This $\sigma$/T is then approximated by $$\frac{\sigma}{T} = 1.37 \cdot \frac{L}{T} \quad (21)$$

From equation (21), the time scale coefficient $\sigma$ reduces to $$\sigma = 1.37 \cdot L \quad (22)$$

Then, by substituting equation (22) into equations (13) to (15), the proportional gain Kp, integration time Ti and differential time $T_D$ can be determined as follows:

$$Kp = \frac{0.215L + T}{1.37K \cdot L} \quad (23)$$

$$Ti = 0.315L + T \quad (24)$$

$$T_D = \frac{0.315L \cdot T + 0.003L^2}{0.315L + T} \quad (25)$$

Therefore, the proportional gain calculator 8 computes equation (23) to determine the optimum value Kp of proportional gain on the basis of K, L and T, the integration time calculator 9 computes equation (24) to determine the optimum value Ti of integration time and the differential time calculator 10 computes equation (25) to determined the optimum value $T_D$ of differential time, thereby ensuring that the proportional gain Kp, integration time Ti and fifferential time $T_D$ of the PID controller 1 can respectively be set and 2 may be In equation (25), the term of $L^2$ may be neglected for L being smaller than T and the differential time $T_D$ may be computed in accordance with $$T_D = \frac{0.315L \cdot T}{0.315L + T} \quad (26)$$

Figure 21A:
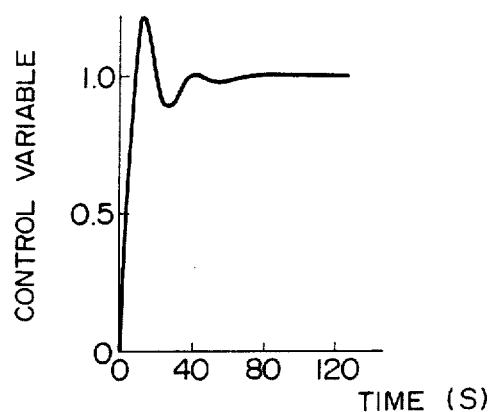
FIGS. 21A, 21B and 21C are graphs respectively showing control response obtained when the dead time and secondary time lag characteristics are controlled under the conditions of L/T=0.14, L/T=1 and L/T=5 by changing the command value stepwise.
Figure 21B:
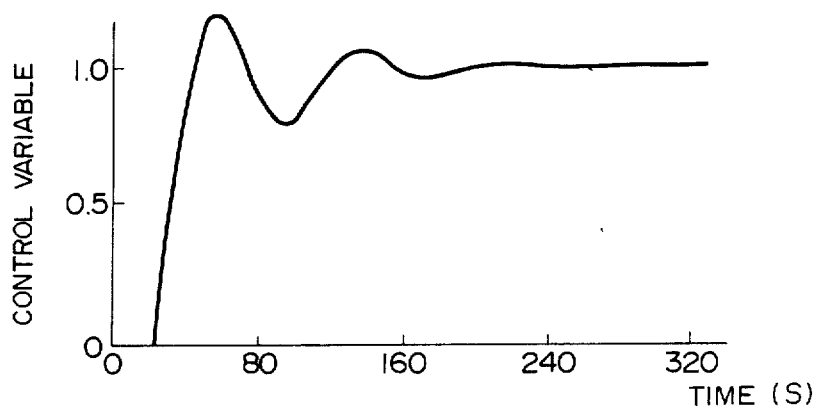
Figure 21C:
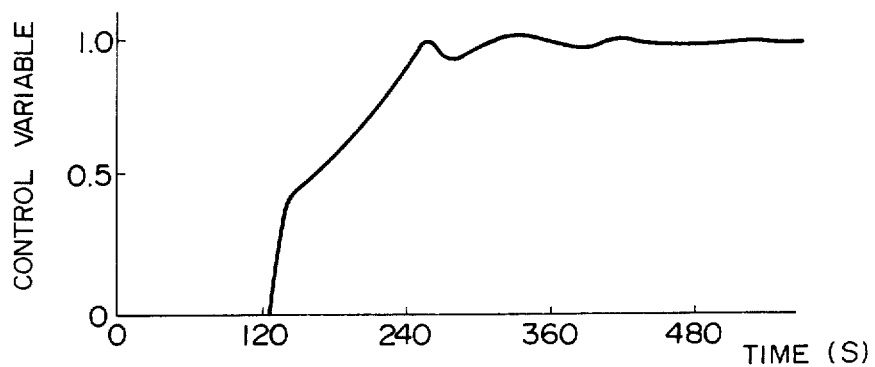

With the embodiment of FIG. 19, the control response of the object process having the dead time and secondary time lag characteristics as in the case of FIGS. 1A, 1B, 3A, 3B and 3C is examined by changing the command value in unit step to obtain results as graphically illustrated in FIG. 21A for L/T=0.14, in FIG. 21B for L/T=1 and in FIG. 21C for L/T=5, demonstrating that even for L/T being large, an excellent control characteristic can be obtained.

Although all of the foregoing embodiments have been described in terms of hardware for clarity of explanation, they may obviously be realized with software by the aid of a computer in a similar manner.

We claim:

1. A PID controller system comprising:
a PID controller for receiving a difference between a set point and a controlled variable of a process to be controlled and delivering a manipulated variable to the process, the process being operated by the manipulated variable to produce the controlled variable; and
automatic adjuster means including
a control variable response shape recognizer means for receiving the set point and controlled variable of the process and determining a plurality of performance indexes on the basis of a response shape of the controlled variable obtained when the set point is changes or a disturbance is applied;

a control parameter modifier means having a plurality of evaluation means for utilizing a plurality of performance indexes, and interpreting magnitudes of the plurality of performance indexes and defining magnitudes of control parameter modifying coefficients by using a plurality of qualitative values, and inferring the control parameter modifying coefficients through fuzzy inference by using a plurality of adjusting rules which express an interrelation between the performance indexes and the control parameter modifying coefficients by the plurality of qualitative values;

said automatic adjuster means being responsive to a variable relating to the manipulation of said PID controller and the controlled variable from the process to obtain performance indexes and preparing, on the basis of the performance indexes, optimum control parameters for tuning the controlled variable to the set point, the optimum control parameters being fed back from said automatic adjuster means to said PID controller.

2. A PID controller system according to claim 1 wherein said plurality of performance indexes are overshoot, damping ratio.

3. A PID controller system according to claim 1 wherein said plurality of performance indexes are overshoot, damping ratio and period ratio defining a ratio between the previous and current values of the period.

4. A PID controller system according to claim 1 wherein said plurality of performance indexes are overshoot, damping ratio and rise time ratio defining a ratio between previous and current values of the rise time.

5. A PID controller system according to claim 1 wherein said plurality of performance indexes are overshoot, damping ratio and tuning time ratio defining a ratio between the previous and current values of the tuning time.

6. A PID controller system comprising:
a PID controller for receiving a difference between a set point and a controlled variable of a process to be controlled and delivering a manipulated variable to the process, the process being operated by the manipulated variable to produce the controlled variable; and
automatic adjuster means, including a process estimator means for controlling the process and for producing gain, dead time and time constant characteristics to be utilized in the process;
proportional gain calculator means responsive to the gain, dead time and time constant characteristics produced by said process estimator means to set the proportional gain;
an integral time calculator means responsive to the dead time and time constant characteristics produced by said process estimator means to set the integral time; and
derivative time calculator means responsive to the dead time and time constant characteristics produced by said processor estimator means to set a derivative time.

7. A PID controller system according to claim 6, wherein said integral time calculator means determines the integral time by adding the dead time characteristic and the time constant characteristic, said proportional gain calculator means determining the proportional gain by dividing the integral time resulting from addition by the product term of the gain and dead time characteristics, and said derivative time calculator means determines the derivative time by dividing the product term of the gain and mean time characteristics by the integral time resulting from the addition.

8. A PID controller system according to claim 6 wherein output Kp of said proportional gain calculator means, output Ti of said integral time calculator means and output $T_D$ of said derivative time calculator means are respectively determined by $$Kp = \frac{0.315L + T}{1.37K \cdot L}$$

$$Ti = 0.315L + T$$

$$T_D = \frac{0.315L \cdot T + 0.003L^2}{0.315L + T}$$

where K is the gain characteristic, T is the dead time characteristic and L is the time constant characteristic.

9. A PID controller system according to claim 6, wherein said automatic adjuster means is responsive to a variable relating to the manipulation of said PID controller and the controlled variable from the process to obtain performance indexes and prepares, on the basis of said performance indexes, optimum control parameters for tuning the controlled variable to the set point, the optimum control parameters being fed back from said automatic adjuster means to said PID controller.

* * * * *